United States Patent [19]
Kiyono

[11] Patent Number: 5,957,992
[45] Date of Patent: Sep. 28, 1999

[54] VEHICLE CRUISE CONTROL SYSTEM AND METHOD HAVING IMPROVED TARGET SPEED RESOLUTION FEATURE

[75] Inventor: Masashi Kiyono, Anjo, Japan

[73] Assignee: Nippondenso Co., Ltd., Kariya, Japan

[21] Appl. No.: 08/712,467

[22] Filed: Sep. 11, 1996

[30] Foreign Application Priority Data

Sep. 11, 1995 [JP] Japan ................................. 7-232228

[51] Int. Cl.⁶ ................................................ B60K 31/04
[52] U.S. Cl. ............................ 701/93; 123/350; 180/179
[58] Field of Search ............................ 701/70, 93, 103, 701/110; 123/350, 349; 180/170, 179

[56] References Cited

U.S. PATENT DOCUMENTS

| | | | |
|---|---|---|---|
| 4,419,729 | 12/1983 | Krieder | 701/93 |
| 4,591,986 | 5/1986 | Nakajima et al. | |
| 4,739,485 | 4/1988 | Hayashi | |
| 5,031,715 | 7/1991 | Ogawa et al. | 180/179 |
| 5,060,744 | 10/1991 | Katoh et al. | |
| 5,137,104 | 8/1992 | Etoh | 701/93 X |
| 5,257,188 | 10/1993 | Sakakibara et al. | 701/53 |
| 5,285,865 | 2/1994 | Sakita | 701/93 |
| 5,389,051 | 2/1995 | Hirate et al. | 701/54 X |

FOREIGN PATENT DOCUMENTS 5-72303  10/1993  Japan .

*Primary Examiner*—William A. Cuchlinski, Jr.
*Assistant Examiner*—Ed Pipala
*Attorney, Agent, or Firm*—Pillsbury Madison & Sutro LLP

[57] ABSTRACT

A vehicular constant-speed running system converges a vehicle speed control of a vehicle quickly to a target vehicle speed when the vehicle is set in a cruise control mode. The vehicular constant-speed running system includes a constant-speed running section for controlling a throttle opening independently of an accelerator opening to maintain a vehicle at a target vehicle speed. It also includes an initial opening setting section which, at the time of transfer by the constant-speed running section, sets the throttle opening before the transfer to an initial value at the time of the transfer if the throttle opening is in a region which is preset based on either the vehicle speed at the time of the transfer or a parameter correlated with the vehicle speed. If the throttle opening is not in this region, the initial opening setting section sets the same throttle opening to the upper limit and/or the lower limit of that region.

20 Claims, 14 Drawing Sheets

FIG. 15A XRSIA XRSID

FIG. 15B XRACT

FIG. 15C SWBS $\begin{bmatrix} SRSET = SWBS \\ SRSETM = SWBS \\ XRACT = 1 \\ XRIINRQ = 1 \end{bmatrix}$

| SWBS (km/h) | 40 | 80 | 120 | 160 | 200 |
|---|---|---|---|---|---|
| PRIINIMX (deg) | 40 | 50 | 60 | 70 | 80 |

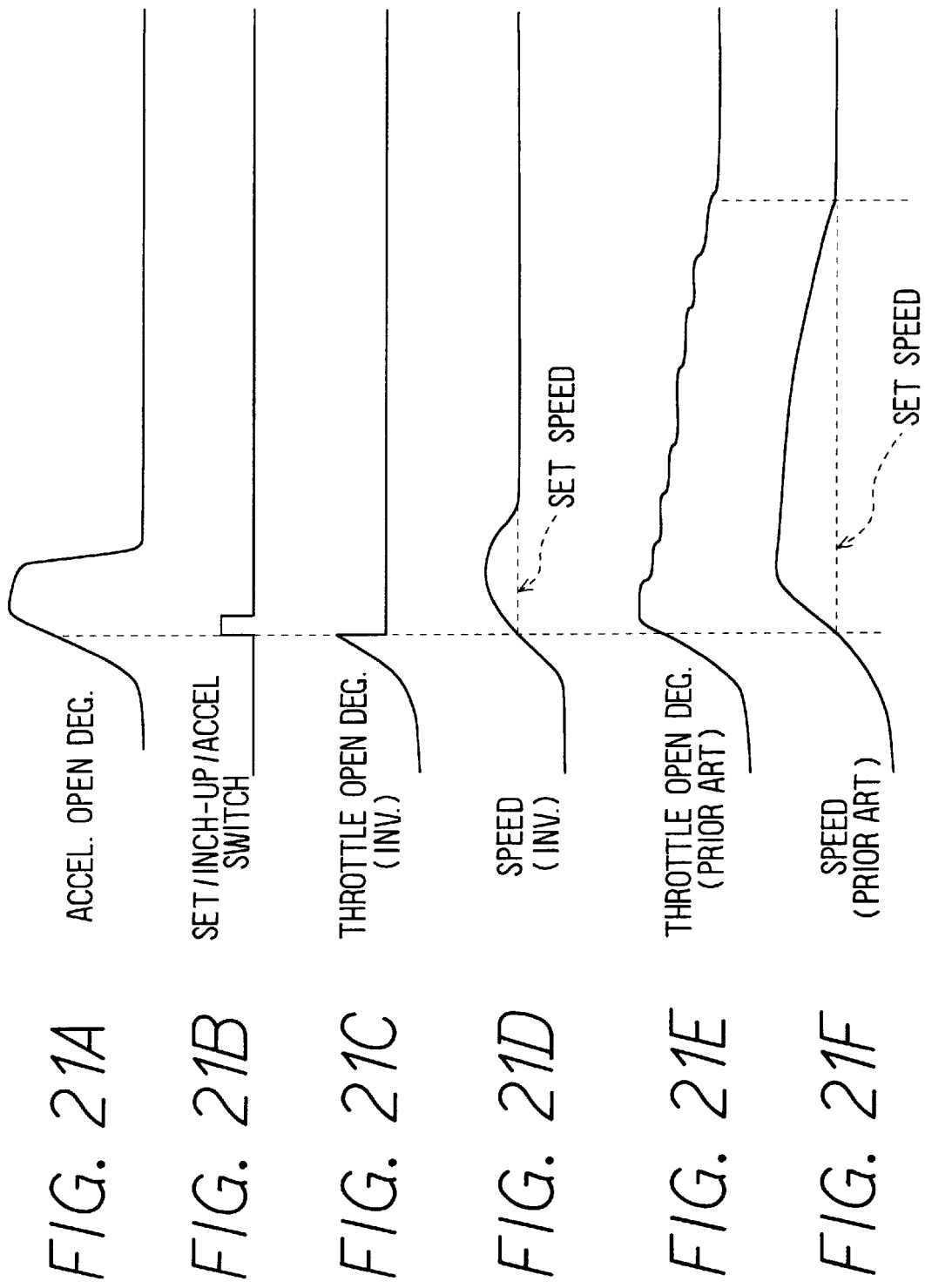

VEHICLE CRUISE CONTROL SYSTEM AND METHOD HAVING IMPROVED TARGET SPEED RESOLUTION FEATURE

CROSS-REFERENCE TO RELATED APPLICATION

The present application is related to and claims priority from Japanese Patent Application No. Hei 7-232228, incorporated herein by reference.

BACKGROUND OF THE INVENTION

1. Field of the Invention

The present invention relates to a vehicular constant-speed running system for changing the speed control of a vehicle from manual control by the driver to automatic control, e.g., "cruise control" (hereinafter "C/C").

2. Description of Related Art

Japanese Patent Publication No. Hei 3-16292 discloses a vehicular constant-speed running system in which the opening of the throttle valve (hereinafter "throttle opening") is initially set at the change of the vehicle speed control from manual to automatic. A tentative target opening of the throttle opening at the C/C set time is stored in advance based on a target vehicle speed so that it is used for the vehicle speed control at the initial stage of the C/C setting.

In this system, the tentative target opening, as stored in advance, is a throttle opening corresponding to the target vehicle speed at the time when the vehicle is running on a flat road. If the C/C setting is made during an uphill or downhill run, the initial value of the throttle opening will deviate significantly from the proper value. As a result, it takes a long time for the actual vehicle speed to coincide with the target vehicle speed using vehicle speed feedback. This is undesirable for the driver.

It is possible that the throttle opening immediately before setting is used as the initial value of the throttle opening at the C/C setting time. According to this method, it is possible to avoid the above-described problem occurring during an uphill or downhill run. Assume that the driver depresses the accelerator pedal after the run at a steady speed by manual control to perform the C/C setting while the vehicle is accelerating. At this time, the initial value of the throttle opening to be used for C/C is far larger than that necessary for the steady run at the vehicle speed for the C/C setting. As a result, it takes a long time for the actual vehicle speed to coincide with the target speed using vehicle speed feedback. This also may make the driver uncomfortable.

Here, according to the general output torque characteristics of the internal combustion engine, the relationship between the throttle opening and the output torque is shown in FIG. 22. Depending upon the engine rotational speed NE, the output torque is saturated for the smaller throttle opening especially in the lower ranges (e.g., where NE=N1). This makes the C/C feedback gain match the region in which the torque gradient before the saturation of the output torque changes substantially proportionally (with reference to the gain compatibility point of FIG. 22). In other words, it is assumed that by opening and closing the throttle opening to some extent that the output torque of the internal combustion engine increases or decreases correspondingly to respectively accelerate or decelerate the vehicle. However, once the throttle opening is initialized to such a large value that the output torque is saturated, the decrease in the output torque delays even if the throttle opening is driven toward the closed direction by the preset feedback gain. As a result, it takes a long time for the actual vehicle speed to coincide with the target speed.

SUMMARY OF THE INVENTION

In view of the above problems of the prior art, it is an object of the present invention to provide a vehicular constant-speed running system in which the vehicle speed converges quickly to a target speed when speed control changes from manual to automatic.

The above object is achieved according to a first aspect of the invention by providing a vehicular constant-speed running system in which the throttle opening is controlled by the constant-speed running mechanism independently of the accelerator pedal opening so that its initial value is regulated, when vehicle speed control transfers to the constant-speed running state, from exceeding the upper limit or lower limit of the throttle opening, as preset on the basis of the vehicle speed at this time by an opening regulating device. As a result, even if vehicle speed control transfers to the constant-speed running state by the constant-speed running mechanism while the throttle opening is highly changed by the depression of the accelerator pedal, the initial value of the throttle opening is regulated by the upper limit or lower limit of the throttle opening based upon the vehicle speed at this time so that the throttle opening after the transfer to the constant-speed running state is prevented from deviating significantly from a speed corresponding to the vehicle speed at that time.

Preferably, the throttle opening is controlled by the constant-speed running mechanism independently of the accelerator pedal opening, so that its initial value is regulated, when the vehicle transfers to the constant-speed running state, from exceeding the upper limit or lower limit of the throttle opening, as preset on the basis of the R.P.M. of the drive wheels of the vehicle at this time by the opening regulating section. As a result, even if the vehicle speed control transfers to the constant-speed running state by the constant-speed running mechanism while the throttle opening is highly changed by the depression or the like of the accelerator pedal, the initial value of the throttle opening is regulated by the upper limit or lower limit of the throttle opening based upon the rotational speed of the drive wheels of the vehicle at that time so that the throttle opening after transfer to the constant-speed running state is prevented from deviating significantly from a speed corresponding to the rotational speed of the drive wheels of the vehicle at that time.

Preferably, the throttle opening is controlled by the constant-speed running mechanism independently of the accelerator pedal opening so that its initial value is regulated, when the vehicle transfers to the constant-speed running state, from exceeding the upper limit or lower limit of the throttle opening, as preset on the basis of the engine rotational speed at that time by the opening regulating device. As a result, even if the vehicle speed control transfers to the constant-speed running state by the constant-speed running mechanism while the throttle opening is highly changed by the depression of the accelerator pedal, the initial value of the throttle opening is regulated by the upper limit or lower limit of the throttle opening based on the engine rotational speed at that time so that the throttle opening after the transfer to the constant-speed running state is prevented from deviating significantly from a speed corresponding to the engine rotational speed at that time.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 15A–15C are timing diagrams corresponding to FIG. 14;

FIGS. 21A–21F are is timing diagrams showing the transitional states of the throttle opening and the vehicle speed in the embodiment as compared with those of the prior art.

DETAILED DESCRIPTION OF THE PRESENTLY PREFERRED EXEMPLARY EMBODIMENTS

The present invention will be described in connection with its specific modes of embodiment.

Figure 1:
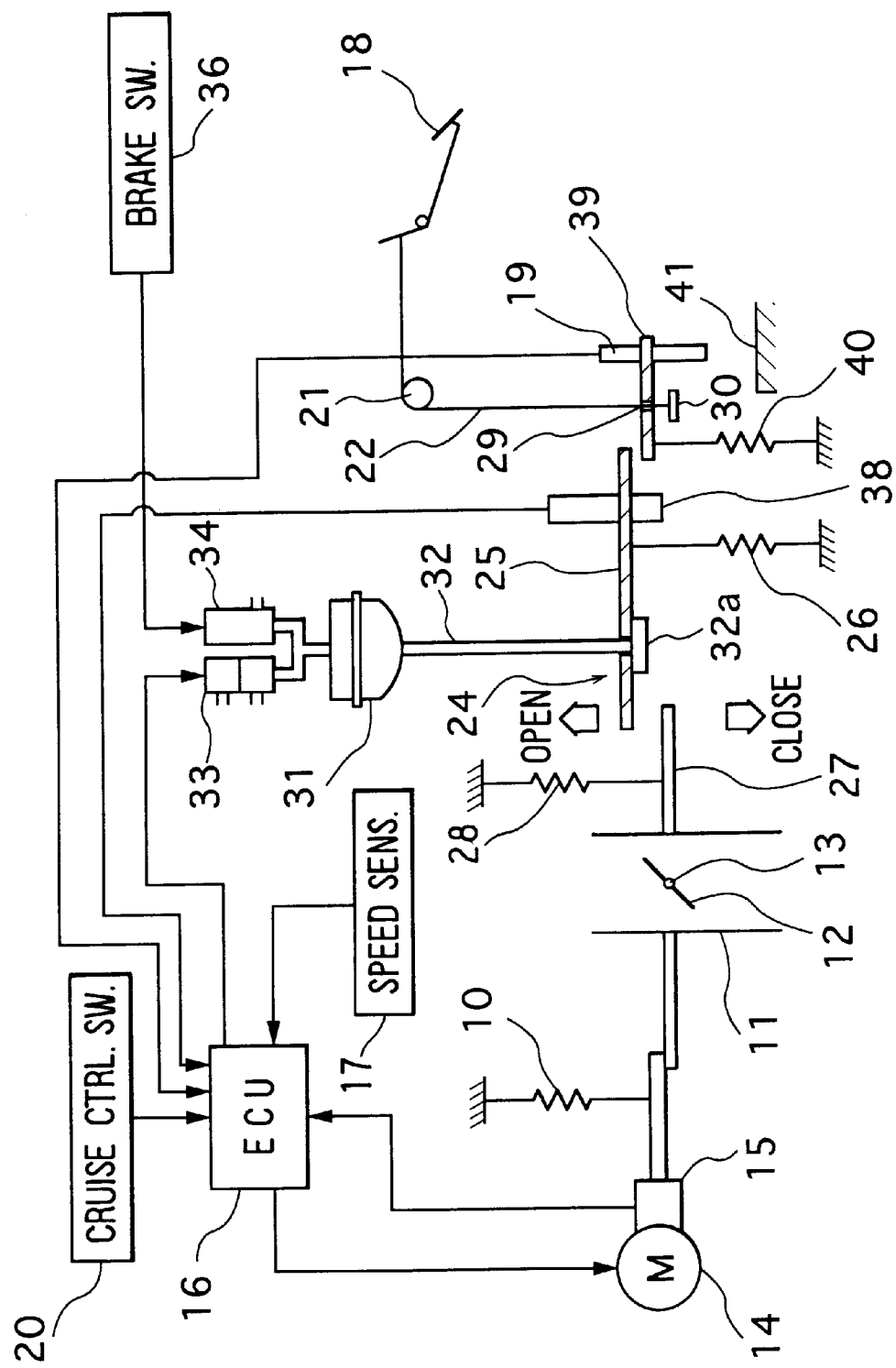
FIG. 1 is a schematic diagram showing the entire construction of a vehicular constant-speed running system according to a preferred embodiment of the present invention.

FIG. 1 is a schematic diagram showing the entire construction of a vehicular constant-speed running, or cruise control system according to a preferred embodiment of the present invention.

A throttle valve 12 is mounted on a shaft 13 in a throttle body 11 so it can be rotationally opened and closed. This throttle valve 12 is driven by a throttle actuator 14 such as a DC motor or a step motor, and is biased toward its open side by a spring 10.

The throttle body 11 is equipped with a throttle opening sensor 15 for detecting the opening degree of the throttle valve 12. The throttle opening sensor 15 provides a throttle opening signal to an electronic control unit (ECU) 16. The ECU 16 also receives a vehicle speed signal from a vehicle speed sensor 17, an accelerator opening signal from an accelerator opening sensor 19 for converting the depression of an accelerator pedal 18 into an electrical signal, a guard opening signal from a guard opening sensor 38 for converting a guard opening into an electronic signal, and a C/C signal from a C/C switch 20. On the basis of these individual signals, the ECU 16 controls the throttle actuator 14. Incidentally, the accelerator pedal 18 is connected to an accelerator lever 39 through a wire 22 mounted around a roller 21.

A guard mechanism 24 for restricting the maximum opening of the throttle valve 12 mechanically is constructed, as shown in FIG. 1, of an opening regulating member 25 moveable vertically in the Figure, and a spring 26 for biasing the opening regulating member 25 toward the closed side (i.e., downward in the Figure). The leftmost portion of the opening regulating member 25 is located just above a lever 27 which can turn together with the throttle valve 12. The lever 27 is biased toward the open side (i.e., initially upward in the Figure) by a spring 28. The elastic constant of the spring 28 is less than that of the spring 26.

Usually, the throttle valve 12 is biased toward the open side by the spring 28 and can be opened until the lever 27 abuts the opening regulating member 25. Once the lever 27 abuts the opening regulating member 25, the opening motion of the throttle valve 12 is blocked by the force of the spring 26 of the guard mechanism 24. As a result, the throttle opening is prevented from exceeding the opening of the guard mechanism 24 (i.e., the guard opening), as determined depending by the position of the opening regulating member 25.

The lower limit opening of the opening regulating member 25 is restricted by the accelerator lever 39 which is associated with the depression of the accelerator pedal 18. The accelerator lever 39 is biased toward the closed side by a spring 40. A fully closed stopper 41 is disposed below the accelerator lever 39 on the closed side. The accelerator lever 39 has a through hole 29, and the wire 22 of the accelerator pedal 18 passes through the through hole 29. A stopper 30 which is located below the opening regulating member 25 is fixed on the wire 22.

Under ordinary running conditions (i.e., conditions other than C/C running conditions), the driver depresses the accelerator pedal 18 and the accelerator lever 39 moves upward (i.e., to the open side) so that the opening regulating member 25, as restricted at its lower limit opening by the accelerator lever 39, also moves upward. As a result, the throttle valve 12 (or the lever 27) can move freely downward (i.e., toward the closed side) with respect to the opening regulating member 25.

On the other hand, the guard opening (or the position of the opening regulating member 25) can be changed by a guard actuator 31. This guard actuator 31 is typically a vacuum actuator having a diaphragm mounted therein and is equipped with a moving rod 32 which moves up and down responsive to the displacement of the diaphragm. The lower end portion of the moving rod 32 is connected through a stopper 32a to the left side portion of the opening regulating member 25 so that the opening regulating member 25 moves up and down as the moving rod 32 moves up and down.

The guard actuator 31 is equipped with a vacuum control valve 33 and a relief valve 34. The vacuum control valve 33 is connected to a vacuum source, and the relief valve 34 has an air vent hole. The vacuum control valve 33 and the relief valve 34 are controlled by the ECU 16.

The power supply to the relief valve 34 is interrupted by an output signal of a brake switch 36. As a result, even if the relief valve 34 is left ON because of some fault of the ECU 16, the power supply to the relief valve 34 is stopped without fail so that the moving rod 32 can be reliably prevented from being left in its upper position.

This ECU 16 has a number of control routines stored in an internal ROM (described in greater detail below) and executes those control routines to control the throttle opening in accordance with ordinary accelerator operation, to control the throttle opening in accordance with the vehicle speed in the C/C running mode, and to control the guard opening in accordance with the throttle opening in the C/C running mode. Especially in the C/C running mode, the ECU 16 turns the vacuum control valve 33 and the relief valve 34 on and off to control the guard actuator 31 so that the guard opening may exceed the throttle opening slightly.

Next, the hardware construction of the ECU 16 will be described with reference to FIG. 2.

Figure 2:
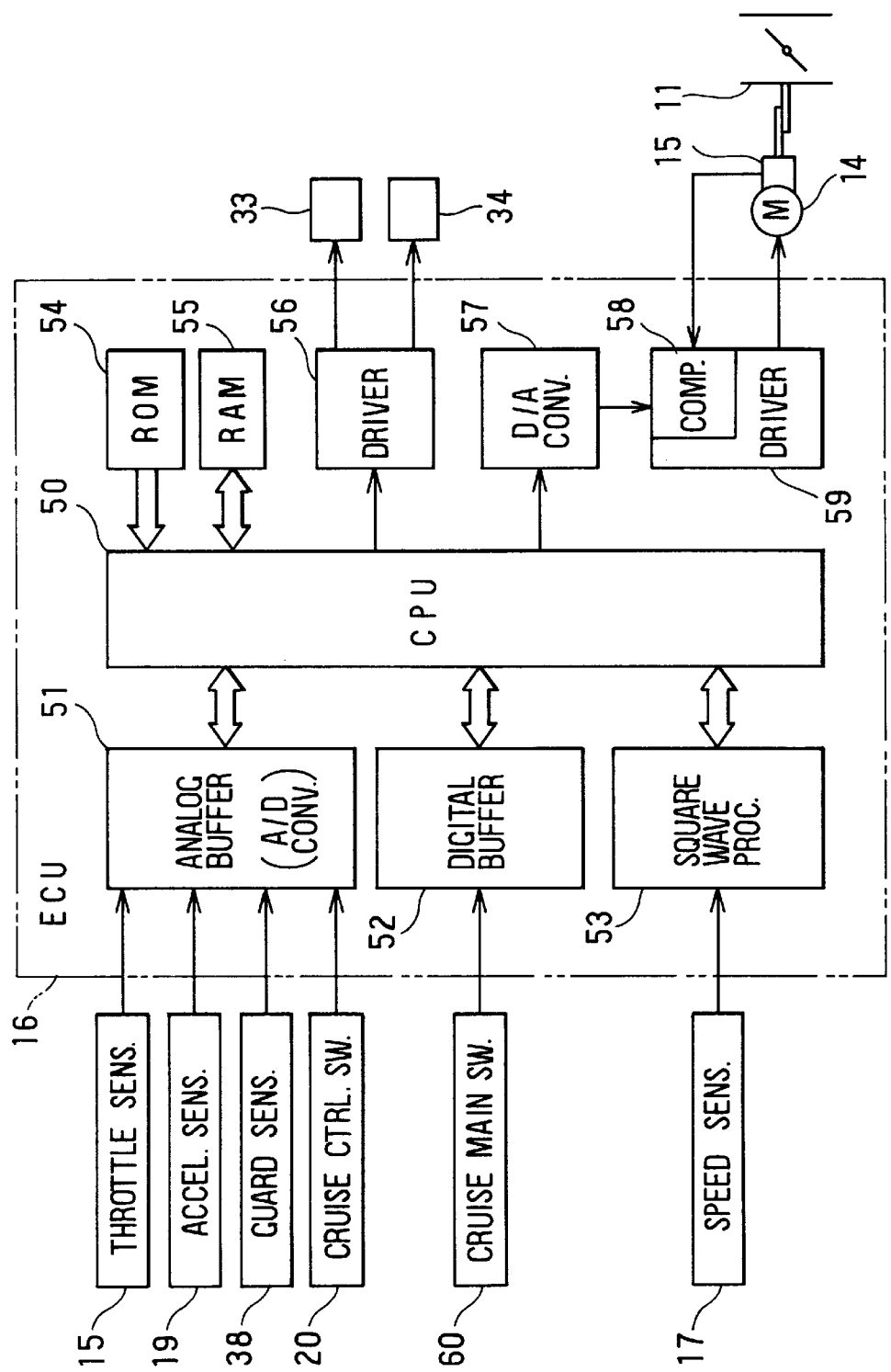
FIG. 2 is a block diagram showing a hardware construction of an ECU in the vehicular constant-speed running system according to the embodiment.

FIG. 2 is a block diagram showing a hardware construction of an ECU in the vehicular constant-speed running system according to the embodiment.

The ECU 16 is composed mainly of a CPU 50 as a central processing unit, an analog buffer (or A/D converter) 51, a digital buffer 52, a square wave processor 53, a ROM 54 containing control programs and control tables described below, a RAM 55 storing various data temporarily, a driver 56, a D/A converter 57, a comparator 58, and a driver 59.

The various output signals of the throttle opening sensor 15, the accelerator opening sensor 19, the guard opening sensor 38 and the cruise control switch 20 are provided to the analog buffer (or A/D converter) 51 of the ECU 16. The output signal of a cruise main switch 69 is provided to the digital buffer 52 of the ECU 16. The output signal of the vehicle speed sensor 17 is provided to the square wave processor 53 of the ECU 16. These signals are provided to the CPU 50.

In accordance with the control programs stored in the ROM 54, the CPU 50 processes these signals to compute the later-described target opening of the throttle valve 12 (or the target voltage of the throttle opening sensor 15). The target voltage of this throttle opening sensor 15 is converted from the CPU 50 through the D/A converter 57 into an analog voltage, which is provided to the driver 59 of the throttle actuator 14 having an analog feedback function. The throttle actuator 14 is controlled by the comparator 58 of the driver 59 so that the target voltage and the actual voltage (or the output of the throttle opening sensor 15) may be equalized. In the C/C running mode, moreover, the vacuum control valve 33 and the relief valve 34 of the guard actuator 31 are controlled by the driver 56 so that the guard opening may exceed the throttle opening slightly.

Next, the construction and operations of the C/C switch 20 will be described in detail with reference to FIG. 3.

Figure 3:
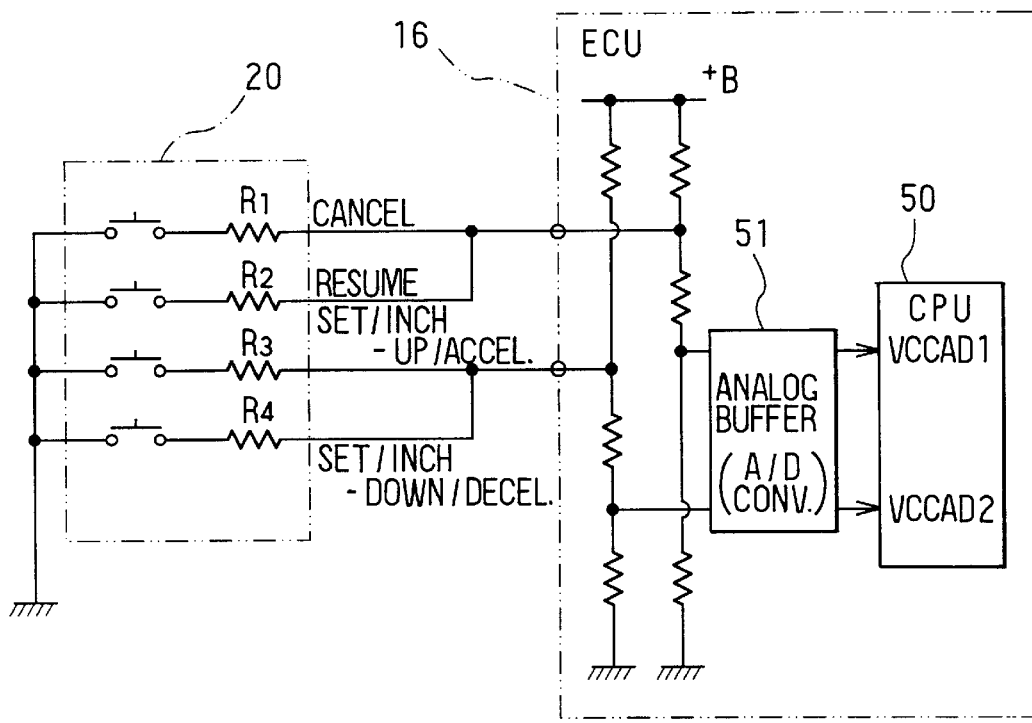
FIG. 3 is a circuit diagram showing a C/C switch connected to the ECU of FIG. 2.

FIG. 3 is a schematic diagram of a C/C switch connected to the ECU 16 of FIG. 2.

The C/C switch 20 is composed of four normally-open switches CANCEL, RESUME, SET/INCH-UP/ACCEL and SET/INCH-DOWN/DECEL, and resistors R1, R2, R3 and R4 respectively connected in series with the switches. The CANCEL switch and the RESUME switch, are connected in parallel, and the SET/INCH-UP/ACCEL switch and the SET/INCH-DOWN/DECEL switch, are connected in parallel, and these are connected to the ECU 16 and further to the individual terminals VCCAD1 and VCCAD2 of the CPU 50 through the analog buffer (or A/D converter) 51 in the ECU 16.

When any of the four switches of the C/C switch 20 is turned ON, a battery voltage +B is divided by the resistance connected in series with that switch and the individual resistances in the ECU 16, and the predetermined voltage is inputted through the analog buffer 51 to the CPU 50 so that the actuation of the C/C switch 20 is detected.

Figure 4:
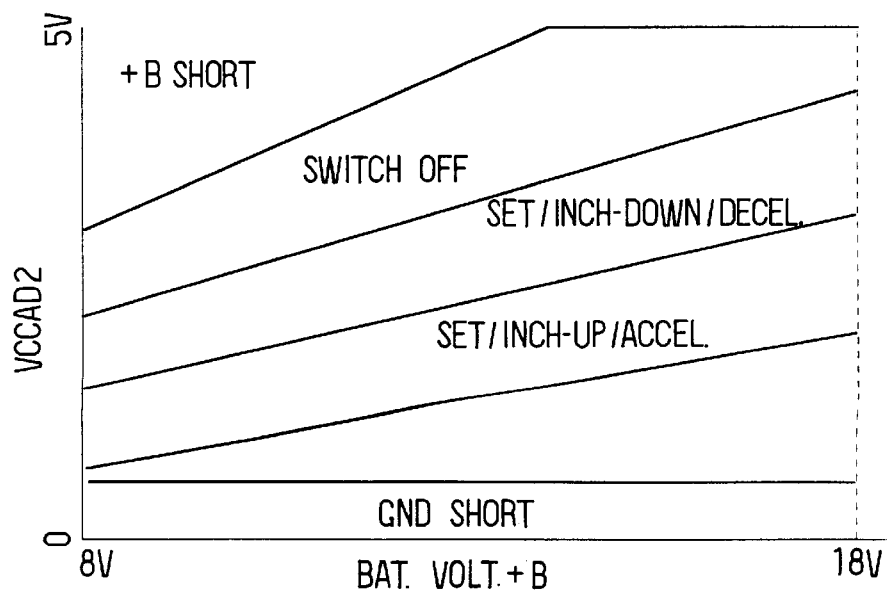
FIG. 4 is a graph of battery voltage versus A/D converted voltage in the embodiment.

FIG. 4 is a graph of battery voltage versus A/D converted voltage in the embodiment. Since the A/D converted voltage from the analog buffer 51 changes with respect to the battery voltage +B, the individual resistances for the SET/INCH-UP/ACCEL switch and the SET/INCH-DOWN/DECEL switch of the C/C switch 20, for example, are set to provide the voltage ranges shown in FIG. 4. This explanation focussed on the A/D converted voltage VCCAD2 (i.e., the SET/INCH-UP/ACCEL and SET/INCH-DOWN/DECEL switches), but a similar discussion applies to VCCAD1 (i.e., the CANCEL and RESUME switches).

Seven C/C running mode commands are described below.

1. SET Command

In a running state other than the C/C running mode, this command starts the C/C running mode responsive to one depression of the SET/INCH-UP/ACCEL switch or the SET/INCH-DOWN/DECEL switch.

2. ACCEL Command

In the C/C running mode, this command increases the running vehicle speed gradually responsive to continuous depression of the SET/INCH-UP/ACCEL switch.

3. DECEL Command

In the C/C running mode, this command decreases the running vehicle speed gradually responsive to continuous depression of the SET/INCH-DOWN/DECEL continuously.

4. INCH-UP Command

In the running state of the C/C run, this command increases the running speed slightly stepwise by depressing the SET/INCH-UP/ACCEL for a short time.

5. INCH-DOWN Command

In C/C running mode, this command decreases the running speed slightly stepwise by depressing the SET/INCH-DOWN/DECEL for a short time.

6. CANCEL Command

In C/C running mode, this command cancels the C/C running state responsive to depression of the CANCEL switch.

7. RESUME Command

When the C/C running state is released by depressing the CANCEL switch or the brake pedal, the running target vehicle speed (or set vehicle speed) at this time is stored in the RAM 55. This command resumes the previous C/C running state by depressing the RESUME switch in this state.

Figure 5:
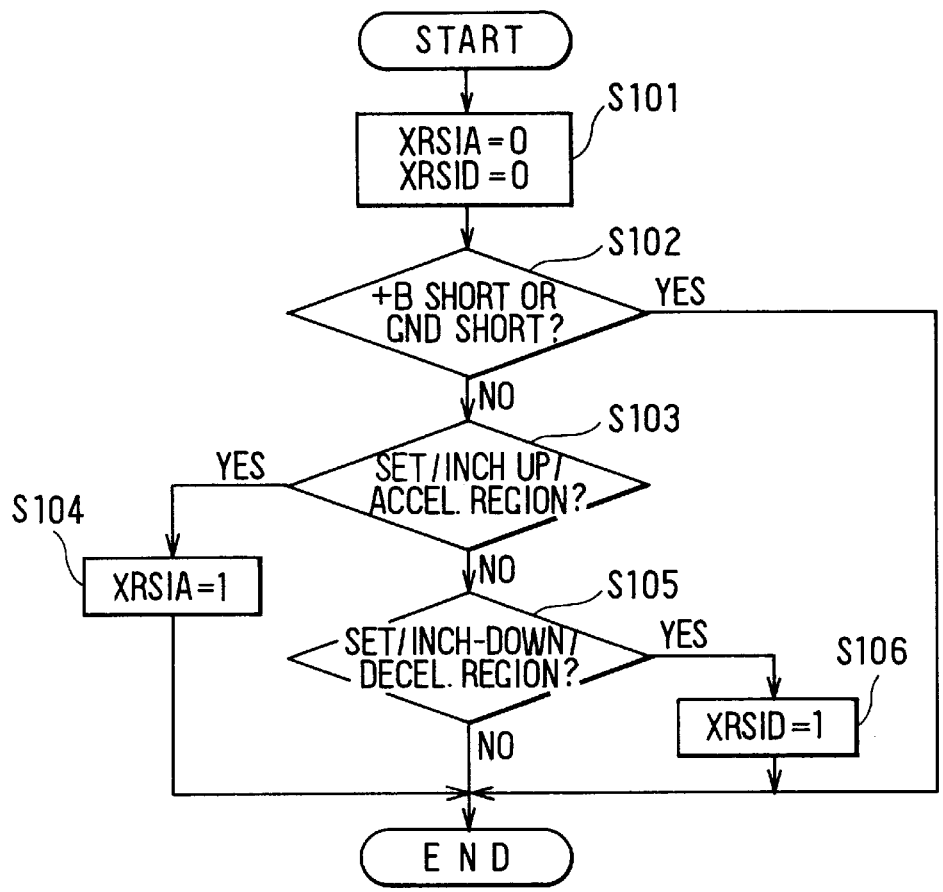
FIG. 5 is a flowchart showing a routine for setting flags by a CPU in the ECU as used in the vehicular constant-speed running system according to the embodiment.

Next, the routine for setting flags by the CPU 50 in the ECU 16, as used in the vehicular constant-speed running system according to the embodiment will be described with reference to the flowchart of FIG. 5. This flag setting routine is preferably executed every 8 ms by the CPU 50 in the ECU 16.

In Step S101, both a flag XRSIA indicating that a SET/INCH-UP/ACCEL switch is depressed and a flag XRSID indicating that a SET/INCH-DOWN/DECEL switch is depressed are reset to "0". Next, Step S102 decides whether the A/D converted voltage is in the +B short region or the GND (Ground) short region for the battery voltage +B, as shown in FIG. 4. If so, the routine terminates. As a result, the flag XRSIA=0 and the flag XRSID =0.

If Step S102 determines the A/D converted voltage is not in the +B short region or the GND (Ground) short region for the battery voltage +B, the routine advances to Step S103 which decides whether or not a SET/INCH-UP/ACCEL switch is ON. If so, the routine advances to Step S104, which sets the flag XRSIA to 1, and the routine terminates. If not, the routine advances to Step S105 which determines whether a SET/INCH-DOWN/DECEL switch is in the ON region. If so, the routine advances to Step S106 which sets the flag XRSID to 1, and the routine terminates. If not, the routine terminates while leaving the flag XRSIA=0 and the flag XRSID=0. Incidentally, the individual flags indicating that the remaining two CANCEL switch and RESUME switch are depressed are likewise set/reset.

Next, the control specifications of the entire C/C system in the ECU 16 will be described in detail with reference to the block diagram of FIG. 6. Because of the C/C system, the control specifications of the CPU 50 in the ECU 16 contain not only the C/C block for computing a target throttle opening PWCC in the C/C running mode but also an ACC block for computing a target throttle opening PWACC in the ordinary running mode. The angle of an output PWTTAX after the target throttle opening PIISC during idle speed control (ISC) is added to an output PWTTAX, for which the higher one of the two outputs PWCC and PWACC is selected, and is converted into a voltage signal. This converted voltage is inputted as the target voltage through the D/A converter 57 to the driver 59 of the throttle actuator 14.

Figure 6:
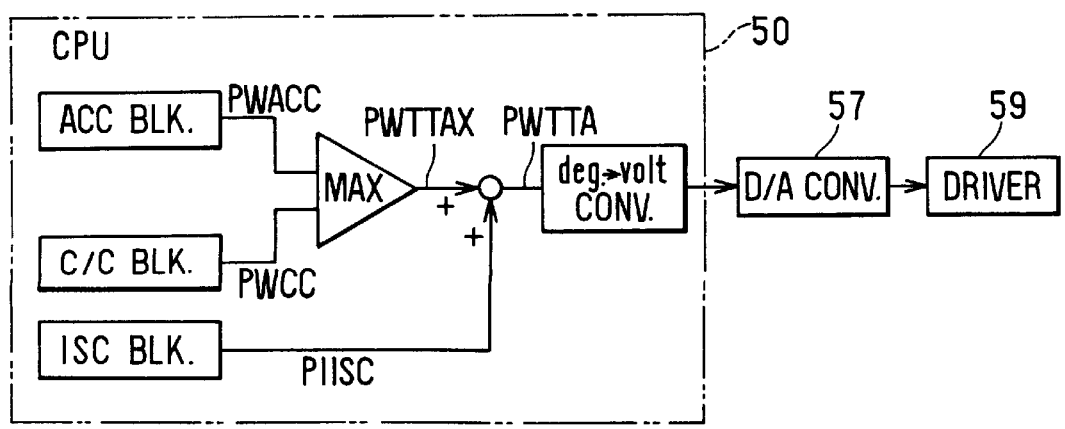
FIG. 6 is a block diagram showing the controls of the entire C/C system in the ECU of the vehicular constant-speed running system according to the embodiment.
Figure 7:
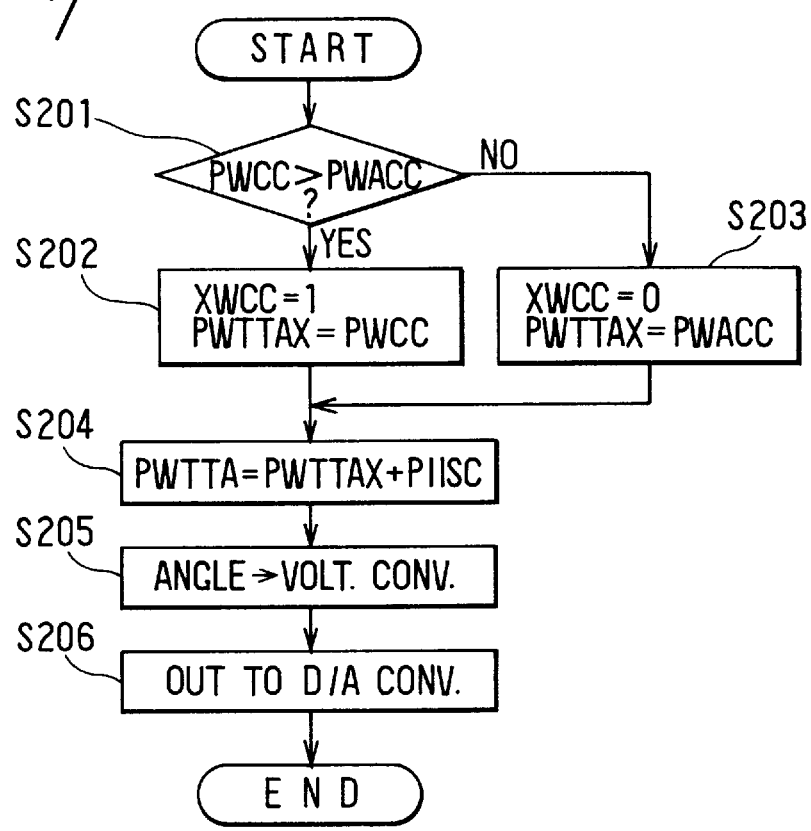
FIG. 7 is a flowchart showing a routine of the CPU in the block diagram of FIG. 6.

FIG. 7 is a flowchart showing a routine of the CPU 50 in the block diagram of FIG. 6, and this routine is preferably executed every 8 ms by the CPU 50 in the ECU 16.

Step S201 decides whether the target throttle opening PWCC computed in the C/C block exceeds the target throttle opening PWACC computed in the ACC block. If so, the routine advances to Step S202 where the flag XWCC indicating that the target throttle opening of the C/C block is selected at present is set to "1" and the target throttle opening PWCC is substituted as the output PWTTAX at the same time.

If the target throttle opening PWCC computed in the C/C block does not exceed the target throttle opening PWACC computed in the ACC block, the routine advances to Step S203, which resets the flag XWCC to "0" and substitutes the target throttle opening PWACC as the output PWTTAX. After execution of Step S202 or Step S203, the routine advances to Step S204, which adds the output PIISC (or the target throttle opening during ISC) to the output PWTTAX to compute the final target throttle opening output PWTTA. Next, the routine advances to Step S205 where the angle is converted into a voltage to determine the final target voltage. After this, the routine advances to Step S206, at which the voltage value, as converted at Step S205, is outputted to the D/A converter 57.

The operations of this embodiment, as described with reference to FIGS. 6 and 7, will be described in more detail for the individual controls with reference to FIGS. 8–19.

Computing the Target Throttle Opening PWACC in the ACC Block

Figure 8:
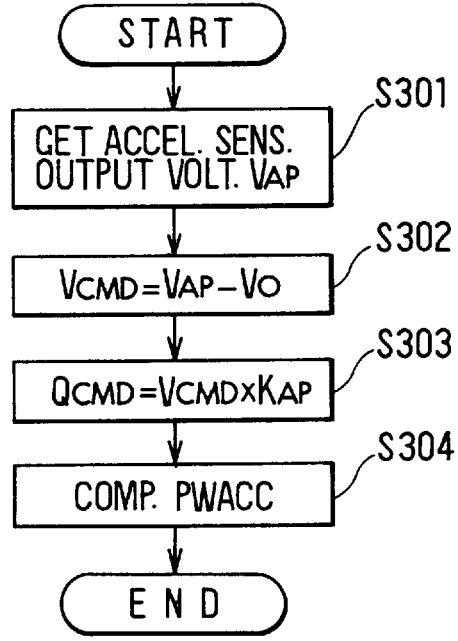
FIG. 8 is a flowchart showing a routine for computing a target throttle opening in an ACC block of the CPU in the ECU of the embodiment.
Figure 9:
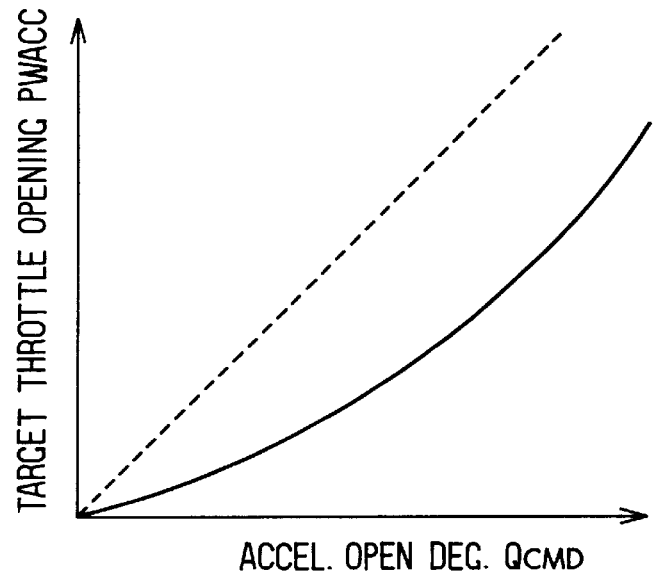
FIG. 9 is a graph of accelerator opening versus target throttle opening in the embodiment.

FIG. 8 is a flowchart showing a routine for computing a target throttle opening in an ACC block of the CPU 50 in the ECU 16 according to the present embodiment, and FIG. 9 is a graph of accelerator opening versus target throttle opening.

Step S301 reads a signal voltage $V_{AP}$ from the accelerator opening sensor 19, and in Step S302, a voltage $V_{CMD}$ corresponding to the actual depression by the driver is computed as $(V_{AP}-V_0)$ because the signal voltage $V_{AP}$, as read at Step S301, also contains the offset voltage $V_0$ which exists at the time when the accelerator pedal 18 is not depressed. Here, the offset voltage $V_0$ may be constant and may be used as the fully closed voltage adjusting value of the accelerator opening sensor 19 at the throttle body shipping time, or the voltage value at the fully closed time of the accelerator opening sensor 19 may be stored as a learning value in the RAM 55 so that this stored value may be used.

Next, the routine advances to Step S303 where the voltage $V_{CMD}$ is multiplied by a gradient $K_{AP}$ [deg/volt] of the sensor characteristic of the accelerator opening sensor 19 to compute an accelerator opening $\theta_{CMD}$. Next, the routine advances to Step S304 which computes the target throttle opening PWACC or the final output of the ACC block for the command opening $\theta_{CMD}$ from the driver as computed at Step S303. Here, the relation between the accelerator opening $\theta_{CMD}$ and the target throttle opening PWACC is ordinarily a downward convex non-linear characteristic, as shown in the FIG. 9, to improve the drivability.

Setting the C/C Mode CRMOD in the C/C Block

Figure 10:
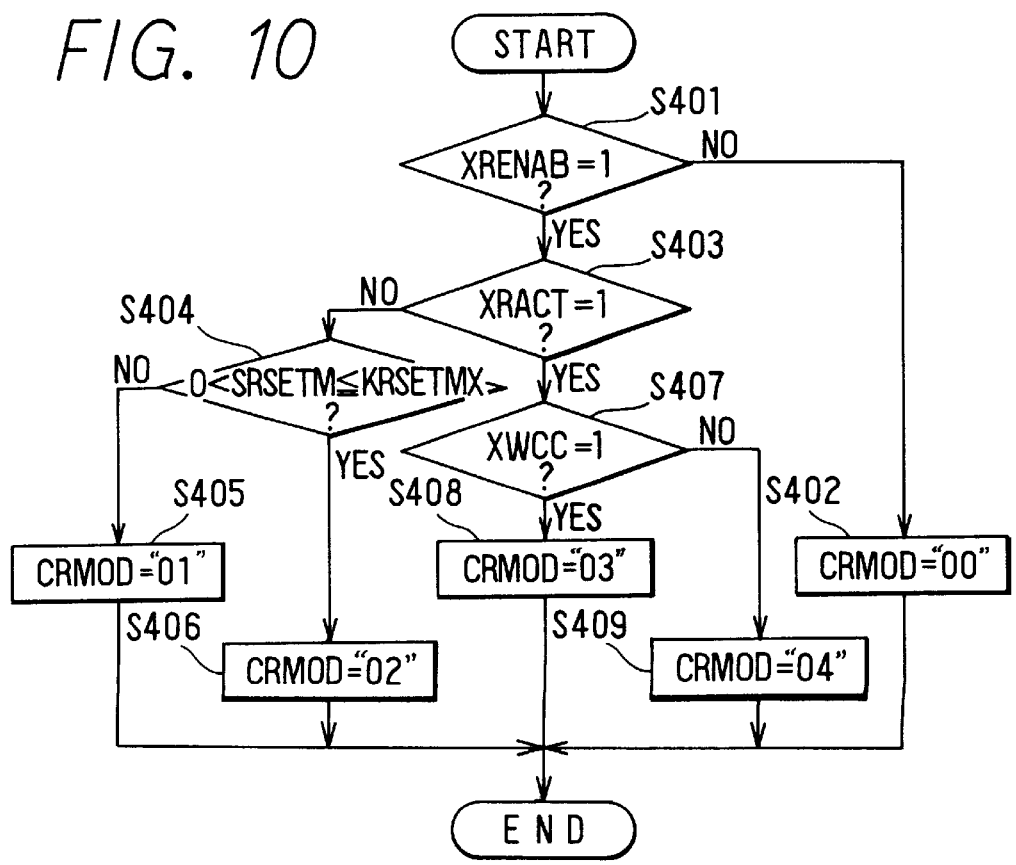
FIG. 10 is a flowchart showing a routine for setting a C/C mode in the C/C block of the CPU in the ECU as used in the embodiment.

FIG. 10 is a flowchart showing a routine for setting a C/C mode in the C/C block of the CPU 50 in the ECU 16 in this embodiment. Since a different command is executed in the C/C running mode in accordance with the running status by using a common switch, the RAM or the C/C mode flag CRMOD for discriminating the running status is defined according to the flowchart shown in FIG. 10. This routine is preferably executed every 8 ms by the CPU 50 in the ECU 16.

Step S401, decides whether a flag XRENAB indicative of the presence of basic conditions necessary for C/C execution, such as whether the parking brake is pulled, whether the vehicle speed is excessive (e.g., over 200 Km/h) and whether the transmission is in neutral, is XRENAB=1. If not, the routine advances to Step S402, at which CRMOD=0 so that a command will not be acted on even if the switch is depressed.

If XRENAB=1, the routine advances to Step S403 which decides whether a flag XRACT (described in greater detail below) indicating that the SET command has already been received is set to 1. If not, the routine advances to Step S404 which determines whether a set vehicle speed SRSETM is stored in the RAM 55 and whether the relationship $0<SRSETM \leq KRSETMX$ is satisfied. If not and SRSETM=0 or SRSETM>KRSETMX, the routine advances to Step S405, where reception of the SET command is enabled by setting CRMOD=1, and the routine terminates. If Step S404 determines that the set vehicle speed SRSETM is stored in the RAM 55 and the relationship 0<SRSETM≦KRSETMX is satisfied, the routine advances to Step S406 which enables reception of the SET command and the RESUME command by setting CRMOD=2, and the routine terminates.

If, however, XRACT=1, the routine advances to Step S407 which decides whether XWCC=1, that is, whether the target throttle opening PWCC of the C/C block is selected, as has been described with reference to FIG. 7. If so, the routine advances to Step S408 which enables reception of the CANCEL command, the ACCEL command, the DECEL command, the INCH-UP command and the INCH-DOWN command by setting CRMOD=3, and the routine terminates. This time corresponds to the period when the vehicle is in the C/C running mode and the driver does not depress the accelerator pedal 18 or depresses it only to a small degree so that PWCC is selected as PWTTAX. If XWCC=1, the routine advances to Step S409 which enables reception of the CANCEL command and the SET command by setting CRMOD=4, and the routine terminates. This time corresponds to the period when the vehicle is physically in the C/C running mode and the driver depresses the accelerator pedal 18 for additional acceleration.

Figure 11:
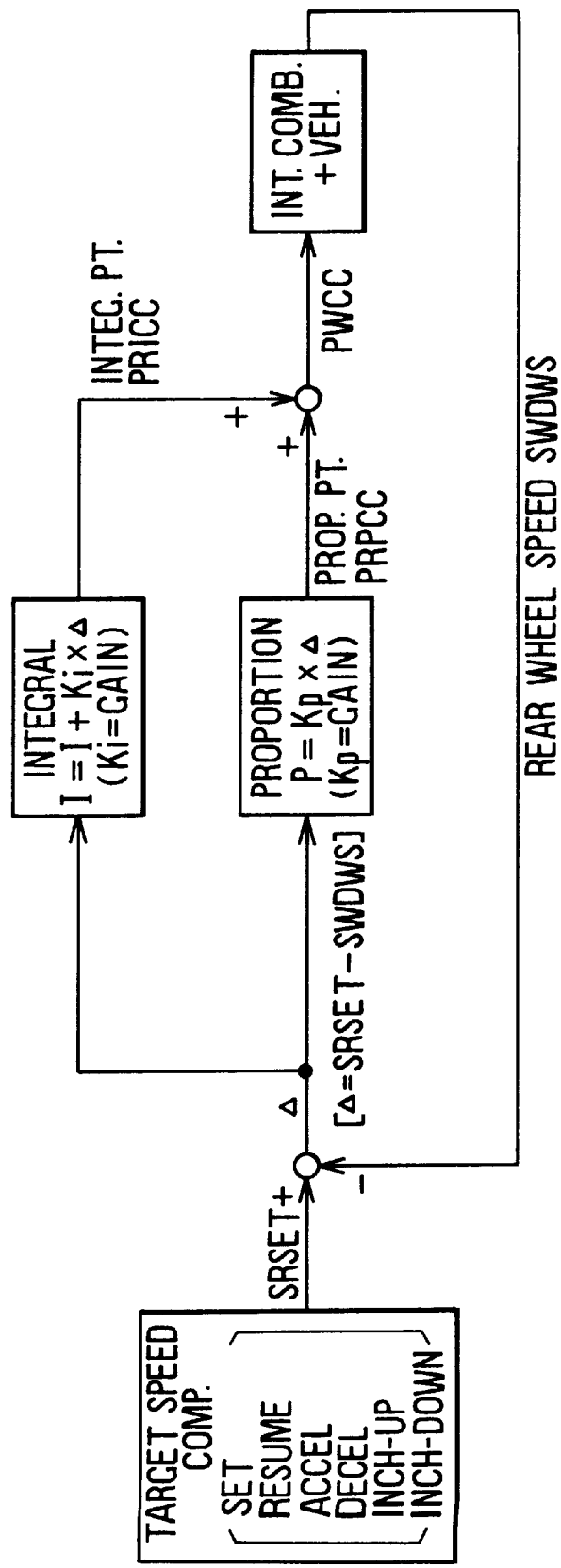
FIG. 11 is a block diagram showing vehicle speed feedback of the vehicular constant-speed running system according to the embodiment.

Next, FIG. 11 shows vehicle speed feedback in this embodiment. A proportional term PRPCC of the throttle opening and an integral term PRICC of the throttle opening are computed from a difference Δ between a target vehicle speed SRSET and a rear wheel speed (or the speed of drive wheels) and are added to provide the target throttle opening PWCC of the C/C block.

Computing the Target Throttle Opening PWCC in the C/C Block

Figure 12:
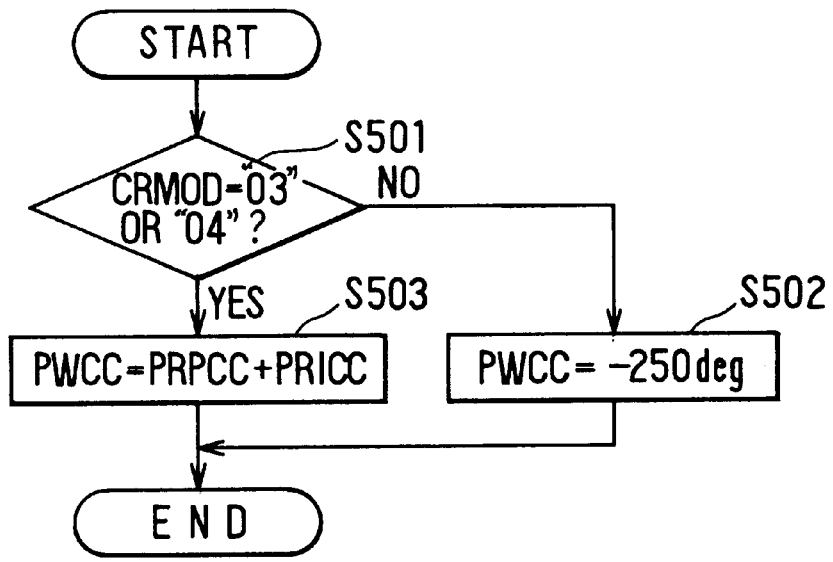
FIG. 12 is a flowchart showing a routine for computing a target throttle opening in the C/C block of the CPU in the ECU as used in the embodiment.

FIG. 12 shows a routine for computing the target throttle opening PWCC in the C/C block. This routine is preferably executed every 8 ms by the CPU 50 in the ECU 16.

Step S501 decides whether the C/C mode CRMOD is at 3 or 4. If not, the routine advances to Step S502, at which a large negative angle such as −250° is substituted into the target throttle opening PWCC because the vehicle is not in the C/C running mode so that the aforementioned decision condition of Step S201 of FIG. 7 will not hold to select the target throttle opening PWCC as the output PWTTAX, and the routine terminates. If, on the other hand, CRMOD is equal to 3 or 4, the vehicle is in the C/C running mode and requires feedback control. Hence, the proportional term PRPCC and the integral term PRICC are added to compute the target throttle opening PWCC, and the routine is terminated.

Computing Proportional Term PRPCC in C/C Block

Figure 13:
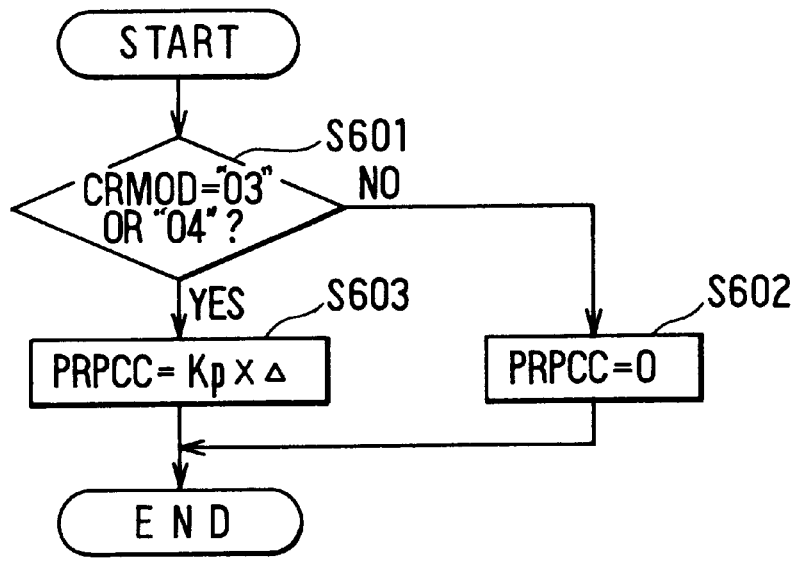
FIG. 13 is a flowchart showing a routine for computing a proportional term of a feedback control in the C/C block of the CPU in the ECU as used in the embodiment.

FIG. 13 shows a routine for computing the proportional term PRPCC of the feedback control in the C/C block. This routine is preferably executed every 16 ms by the CPU 50 in the ECU 16.

Step S601 determines whether the C/C mode CRMOD is 3 or 4. If not, the routine advances to Step S602 where the proportional term PRPCC is set to PRPCC=0 because the vehicle is not in the C/C running mode, and the routine terminates. If, however, CRMOD is 3 or 4, the vehicle is in the C/C running mode and requires feedback control. As shown in FIG. 11, the proportional term PRPCC is therefore computed by multiplying the speed deviation Δ (=SRSET−SWDWS) by a fixed gain Kp, and the routine terminates.

Computing Integral Term PRICC of Feedback Control in C/C Block

Figure 14:
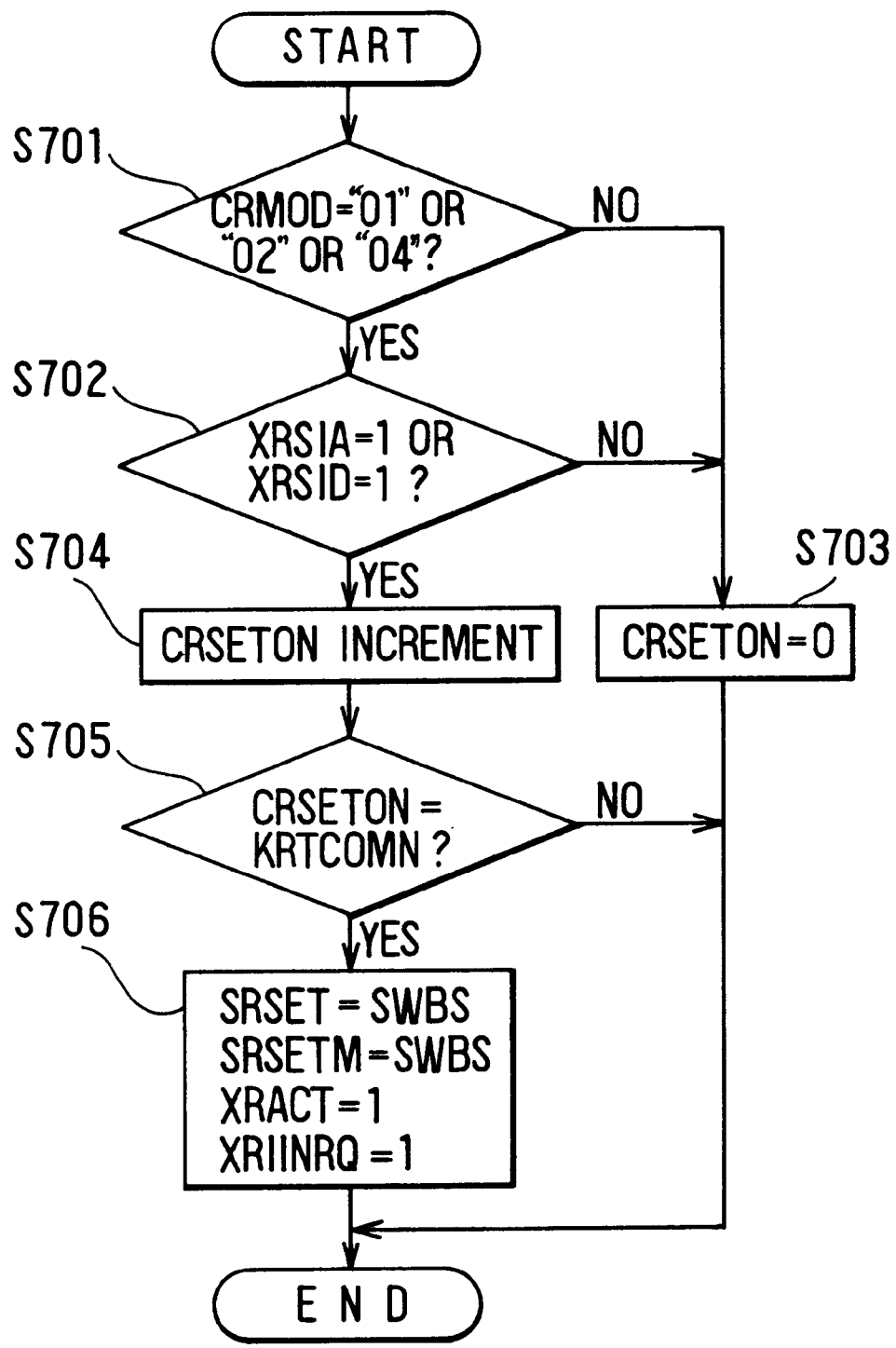
FIG. 14 is a flowchart showing a routine for computing an integral term of feedback control in the C/C block of the CPU in the ECU as used in the embodiment.

FIG. 14 shows a routine for receiving the SET command in the C/C block, and FIGS. 15A–15C show timing diagrams corresponding to this routine. This routine is preferably executed every 32 ms by the CPU 50 in the ECU 16.

Step S701 decides whether the C/C mode flag CRMOD is 1, 2 or 4. If so, the routine advances to Step S702, which decides whether XRSIA=1 or XRSID=1, that is, whether the SET/INCH-UP/ACCEL switch or the SET/INCH-DOWN/DECEL switch is depressed. If either Step S701 or Step S702 results in a determination of "NO", the routine advances to Step S703 which clears the ON counter CRSETON of the flag XRSIA or the flag XRSID, and the routine is terminated.

If, however, XRSIA=1 or XRSID=1 in Step S702, the routine advances to Step S704 which increments the ON counter CRSETON of the flag XRSIA or the flag XRSID. Next, the routine advances to Step S705 which decides whether the SET/INCH-UP/ACCEL switch or the SET/INCH-DOWN/DECEL switch has been depressed for a predetermined time period, that is, whether CRSETON=KRTCOMN (e.g., 480 ms). If not, the routine terminates.

If, however, CRSETON=KRTCOMN, the routine advances to Step S706 where the SET command is received. Specifically, SRSET is set to SWBS so that the vehicle speed at this time is substituted into the set vehicle speed, SRSETM is set to SWBS so that the vehicle speed at this time is substituted into the stored set vehicle speed, XRACT is set to 1 so that the C/C active flag is turned ON, and XRIINRQ is set to 1 so that the flag for setting the initial value of the integral term is turned ON, and the routine is terminated.

Initializing Integral Term PRICC in C/C Block

Figure 16:
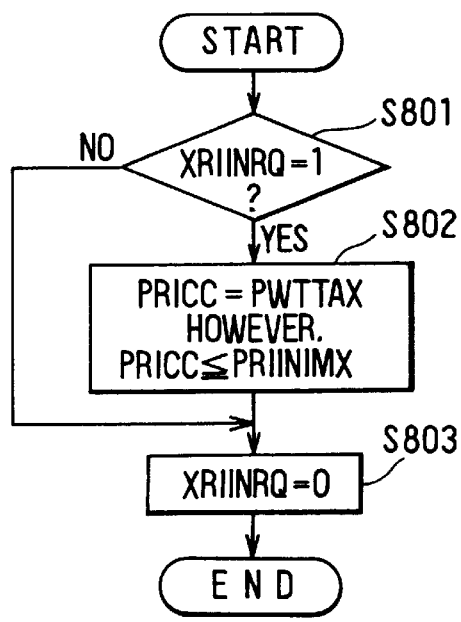
FIG. 16 is a flowchart showing a routine for setting an initial value of the integral term of the feedback control in the C/C block of the CPU in the ECU as used in the embodiment.

FIG. 16 shows a routine for initializing the integral term PRICC of the feedback control in the C/C block. This routine is preferably executed every 16 ms by the CPU 50 in the ECU 16.

Figures 17A, 17B:
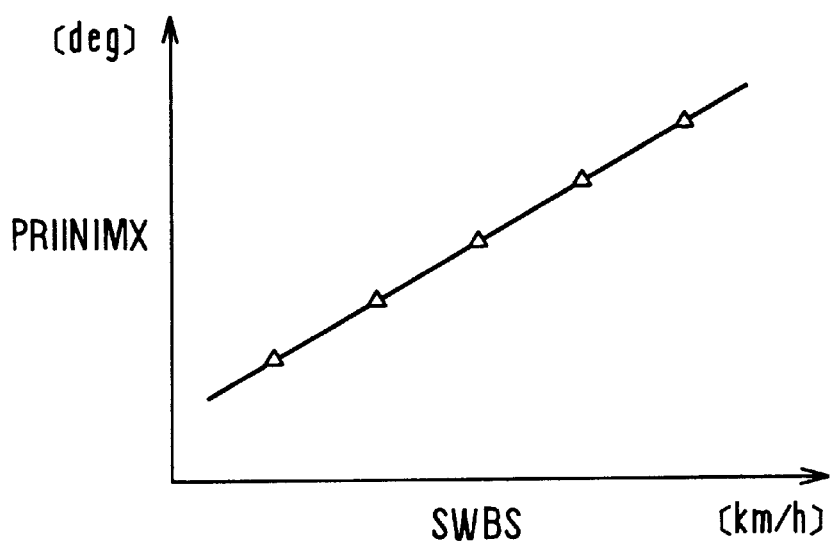
FIG. 17A is a table of a set vehicle speed and an upper limit in the embodiment.
FIG. 17B is a graph of the same.

Step S801 determines whether the integral term initializing flag XRIINRQ set at the time of executing the SET command is 1. If so, the routine advances to Step S802 where the value PWTTAX at this time is substituted as the initial value of the integral term PRICC. As shown in the table of FIGS. 17A and the graph of FIG. 17B, however, the initial value or the integral term PRICC is restricted to no more than an upper limit PRIINIMX [deg], as preset by the vehicle speed SWBS [Km/h] at this time. As a result, even if the C/C switch 20 is set while the driver is depressing the accelerator pedal 18 for acceleration, the initial value of the throttle opening to be used for the C/C running mode can be prevented from becoming far larger than the throttle opening necessary for a steady run of the vehicle speed at the C/C setting time, thereby making the actual vehicle speed coincide with the target vehicle speed. If the decision condition of Step S801 fails to hold, on the other hand, Step S802 is skipped and Step S803 is executed, at which time the integral term initializing flag XRIINRQ is reset, and the routine terminates.

Incidentally, in this embodiment, the upper limit guard is executed by making the initial value no more than the upper limit PRIINIMX preset by the vehicle speed SWBS at this time; however, a lower limit guard can also be executed by making the initial value no less than the lower limit preset by the vehicle speed SWBS at this time, so that the target throttle opening can be prevented from becoming extremely small.

Moreover, this embodiment is preferably used in an FR car, and the rear wheel speed (or the speed of the drive wheels) at the safe side is used as the vehicle speed SWBS at the time of initialization for the parameter to determine the upper limit PRIINIMX of the initial value of the integral term PRICC; however, a similar effect can be achieved even if the front wheel speed (or the speed of the driven wheels) is used. Moreover, since the vehicle speed is proportional to the engine rotational speed multiplied by the gear ratio, the engine rotational speed may be used in place of the vehicle speed if the gear ratio is constant.

Figure 18:
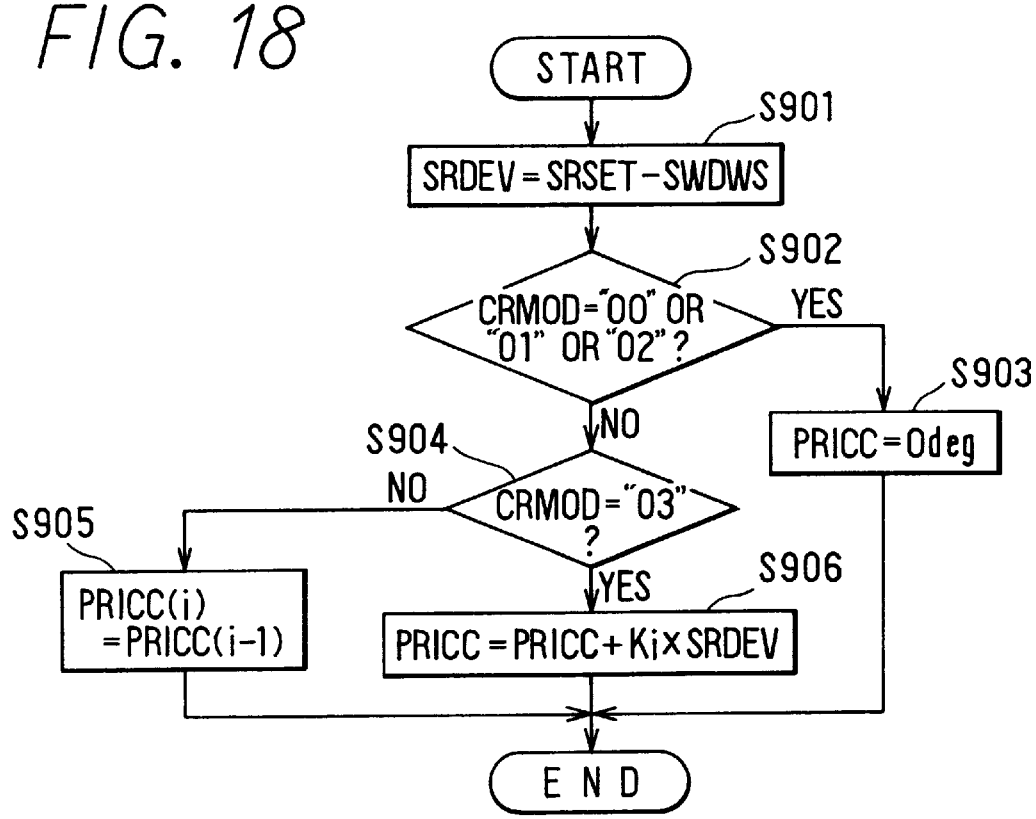
FIG. 18 is a flowchart showing a routine for computing a final integral term of the feedback control in the C/C block of the CPU in the ECU as used in the embodiment.

After the initial value of the integral term PRICC has been set, as described, above, the integral term PRICC of the final feedback control in the C/C block is computed according to the flowchart of FIG. 18. This routine is preferably executed every 65 ms by the CPU 50 in the ECU 16.

Step S901 computes a deviation SRDEV (identical to A, as shown in FIG. 11) between the target vehicle speed SRSET and the rear wheel speed SWDWS. Next, Step S902 determines whether the C/C mode CRMOD is 0, 1 or 2. If so, the vehicle is not in the C/C running mode, and the routine advances to Step S903, where the integral term PRICC is set to PRICC=0°, and the routine ends. If, however, the C/C mode is not 0, 1 or 2, the routine advances to Step S904 which decides whether the C/C mode CRMOD is 3. If not, CRMOD is 4, and the routine advances to Step S905 which holds the integral term PRICC to indicate that the driver has depressed the accelerator pedal 18 for additional acceleration while in the C/C running mode, and the routine ends. If, however, CRMOD is 3, the routine advances to Step S906 and the integral term PRICC is computed by multiplying the speed deviation SRDEV (=SRSET−SWDWS) by a fixed gain Ki, as shown in FIG. 11, for feedback control, and by adding the integral term PRICC, and the routine terminates.

Moreover, an output PIISC for feedback control in the ISC block is determined according to the table using the cooling water temperature of the internal combustion engine as its parameter to retain the initial idle rotational speed during a cold start of the internal combustion engine. Incidentally, it is possible to implement feedback with respect to the engine rotational speed. In any event, this ISC block does not play a significant role in the present invention, and a detailed description thereof will be omitted.

Figure 19:
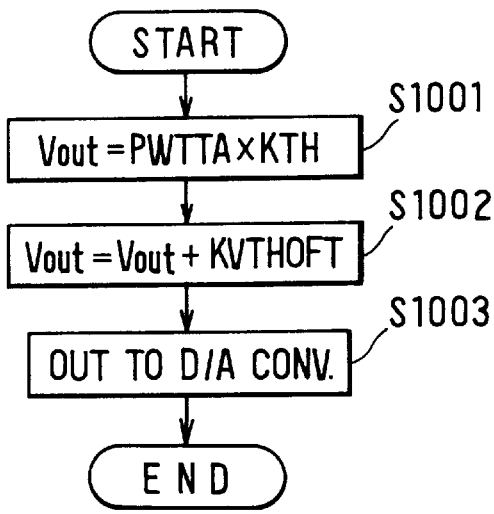
FIG. 19 is a flowchart showing a routine for converting the throttle opening in the ECU, as used in the vehicular constant-speed running system according to the embodiment, into a voltage.

FIG. 19 shows a routine for converting the throttle opening into a voltage. This routine is preferably executed every 8 ms by the CPU 50 in the ECU 16.

Step S1001 computes a target voltage Vout by multiplying the final target throttle opening output PWTTA by a gradient characteristic value KTH (volt/deg) of the throttle opening sensor 15. Since a predetermined offset voltage also exists when the throttle valve 12 is fully closed, the routine advances to Step S1002, where the target voltage Vout is computed by adding an offset voltage KVTHOFT to the target voltage Vout computed at Step S1001. Then, the routine advances to Step S1003 where the target voltage Vout as determined at Step S1002, is outputted to the D/A converter 57, and the routine terminates.

Figure 20:
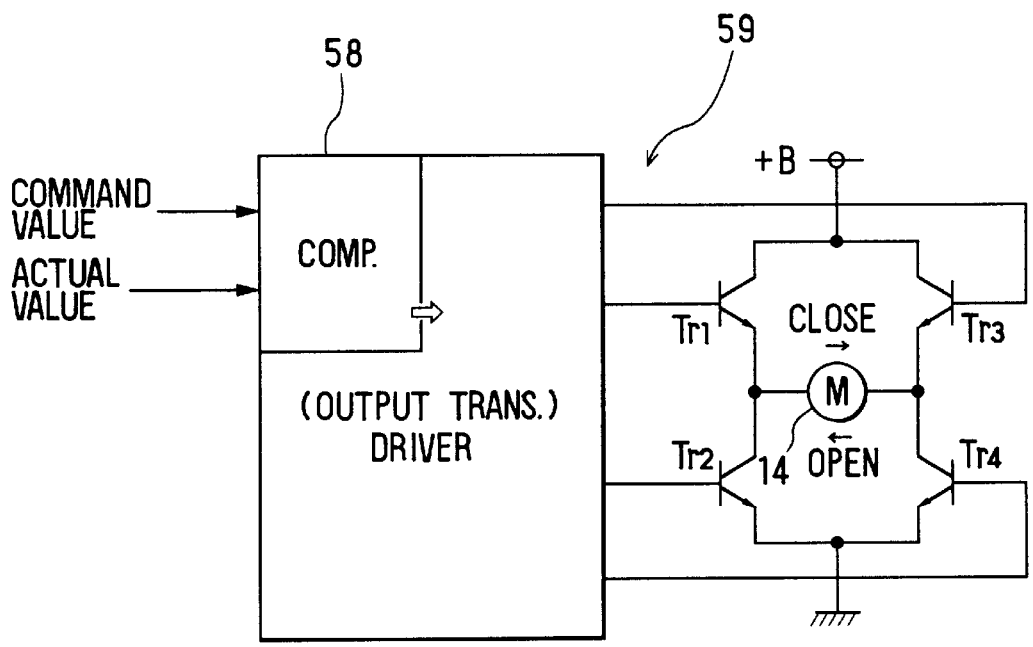
FIG. 20 is a schematic diagram showing an analog feedback circuit as used in the embodiment.
Figure 22:
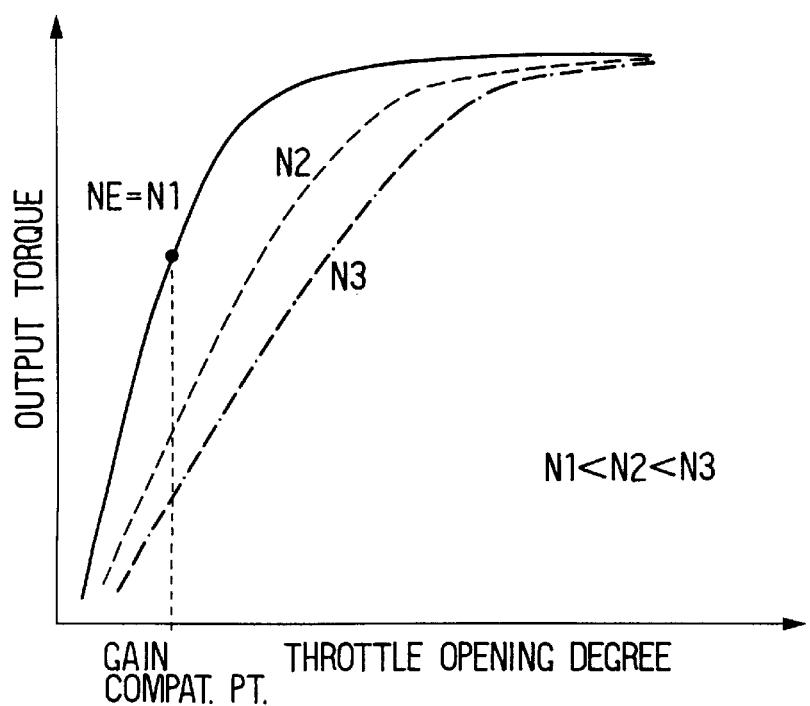
FIG. 22 is a graph of throttle opening versus output torque of a prior art internal combustion engine.

Referring to FIG. 20, the command value from the D/A converter 57 and the actual value from the throttle opening sensor 15 are compared by the comparator 58, and four transistors Tr1, Tr2, Tr3 and Tr4 in the output transistor driver 59 connected to the throttle actuator are controlled so that the deviations are equalized. At this time, the transistors Tr2 and Tr3 are turned ON to open the throttle actuator 14, and the transistors Tr1 and Tr4 are turned ON to close the throttle actuator 14.

FIGS. 21A–21F are timing diagrams showing the transitional states of the throttle opening and the vehicle speed in the embodiment. FIGS. 21A–21F show the case where the accelerator opening is opened responsive to the driver's depression of the accelerator pedal 18 so that the C/C running mode is set by pushing the SET/INCH-UP/ACCEL switch.

When the SET/INCH-UP/ACCEL switch is depressed in the course of the change in the accelerator opening, according to the prior art, the throttle opening takes a large initial value, and it takes a long time for the vehicle speed to converge to the set value. According to the present invention, however, even if the SET/INCH-UP/ACCEL switch is depressed while the accelerator opening is changing to the open side, the initial value of the accelerator opening is guarded at its upper limit on the basis of the vehicle speed at this time. As a result, the subsequent rise in the vehicle speed is suppressed so that the vehicle speed quickly converges to the set value (or the target vehicle speed). Even when the SET/INCH-UP/ACCEL switch is depressed in the course of the change of the accelerator opening to the closed side, although not shown, the initial value of the throttle opening is also guarded at its lower limit on the basis of the vehicle speed at that time. As a result, the subsequent drop of the vehicle speed is suppressed so that the vehicle speed quickly converges into the set value (or the target vehicle speed).

Thus, the vehicular constant-speed running system according to the present mode of embodiment includes the constant-speed running mechanism including the throttle actuator 14, the throttle opening sensor 15, the ECU 16, the vehicle speed sensor 17 and the C/C switch 20 for controlling the throttle opening (or the opening of the throttle valve 12) independently of the operation of the accelerator pedal 18, thereby maintaining the vehicle in the constant-speed running state, and an opening regulating section implemented by the CPU 50 in the ECU 16 for regulating the integral term PRICC as the initial value of the throttle opening, when the vehicle is to be transferred to the constant-speed running state by the constant-speed running mechanism, by the upper limit PRIINIMX or the lower limit of the throttle opening, as preset on the basis of the vehicle speed SWBS at this time.

As a result, the throttle opening is controlled independently of the operation of the accelerator pedal 18 by the constant-speed running mechanism including the throttle actuator 14, the throttle opening sensor 15, the ECU 16, the vehicle speed sensor 17 and the C/C switch 20. When the vehicle is transferred to the constant-speed running state, the integral term PRICC as the initial value of the throttle opening is regulated by the opening regulating section to prevent it from exceeding the upper limit PRIINIMX or the lower limit of the throttle opening preset on the basis of the vehicle speed SWBS at this time.

Thus, even if the running state is transferred to the constant-speed state by the constant-speed running mechanism while the throttle opening is being changed a great degree by the depression of the accelerator pedal, the integral term PRICC as the initial value of the throttle opening is regulated by the upper limit PRIINIMX or the lower limit of the throttle opening based upon the vehicle speed SWBS at this time so that the throttle opening after the transfer to the constant-speed running state is prevented from excessively deviating from the throttle opening matching the vehicle speed at this time.

Moreover, it is preferable that the vehicle speed SWBS in this embodiment uses the rear wheel speed SWDWS as the rotational speed of the drive wheels of the vehicle. In this way, the initial value of the throttle opening is prevented from exceeding the upper limit or the lower limit of the throttle opening, which is preset on the basis of the rear wheel speed SWDWS as the rotational speed of the drive wheels of the vehicle at this time, by the opening regulating section.

Thus, even if the running state is transferred to the constant-speed state by the constant-speed running mechanism while the throttle opening is being changed by the depression of the accelerator pedal 18, the initial value of the throttle value is regulated by the upper limit or the lower limit of the throttle opening, based on the rear wheel speed SWDWS as the rotational speed of the drive wheels of the vehicle at this time, so that the throttle opening after transfer to the constant-vehicle running state is prevented from excessively deviating the throttle opening matching the vehicle speed at this time.

Also, it is alternatively preferable that the vehicle speed SWBS in this embodiment uses the engine rotational speed of the internal combustion engine of the vehicle. In this way, the initial value of the throttle opening is regulated from exceeding the upper limit or the lower limit of the throttle opening which is preset on the basis of the engine rotational speed of the internal combustion engine of the vehicle at this time by the opening regulating section.

Thus, even if the running state is transferred to the constant-speed state by the constant-speed running mechanism while the throttle opening is being changed by the depression of the accelerator pedal 18, the initial value of the throttle value is regulated by the upper limit or the lower limit of the throttle opening, based on the engine R.P.M. of the internal combustion engine of the vehicle at this time, so that the throttle opening after transfer to the constant-vehicle running state is prevented from excessively deviating from the throttle opening matching the vehicle speed at this time.

Incidentally, the foregoing embodiment has been described as applied to a throttle control system having a guard mechanism in which the accelerator pedal 18 and the throttle valve 12 are mechanically connected; however, the invention can also be practiced by eliminating the mechanical guard mechanism and by using similar control specifications even in either a "linkless" throttle control system (or electronic throttle system), in which the throttle opening is controlled by driving the throttle actuator in accordance with the depression of the accelerator pedal, or a throttle control system having a clutch mechanism.

In a conventional C/C system other than the throttle control system, moreover, similar control can be achieved merely by changing the PRICC=PWTTAX into the PRICC= (the throttle opening at that time) at Step S802 in the routine of FIG. 16.

Although in the foregoing embodiment, the initial value of the integral term is set at the time of receiving the SET command, the initial value of the integral term can also be set at the time of receiving the RESUME command.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A vehicular constant-speed running system comprising:
   constant-speed running means for controlling a throttle opening independently of an accelerator setting to maintain a vehicle at a target vehicle speed during a constant-speed running mode; and
   initial opening setting means for setting, at a time of transfer to said constant-speed running mode, a throttle opening before said transfer to an initial throttle opening value of said constant speed running mode, if said throttle opening before said transfer is in a region preset based on a parameter correlated to said vehicle speed, and setting at least one of an upper limit and a lower limit of said region to said initial throttle opening value if said throttle opening before said transfer is not in said region.

2. The system of claim 1, wherein said parameter correlating to said vehicle speed is rotational speed of drive wheels of said vehicle.

3. The system of claim 1, wherein said parameter correlating to said vehicle speed is rotational speed of an engine of said vehicle.

4. The system of claim 1, wherein said constant-speed running means includes means for setting a target throttle opening by computing a proportional term and an integral term said throttle opening based on a difference between said target vehicle speed and a drive wheel speed and by adding said proportional term and said integral term.

5. A constant-speed running system for a vehicle, said system comprising:
   material delivery means for regulating flow of a medium to an engine of said vehicle in accordance with a degree of actuation of said delivery means;
   control means for controlling said degree of actuation of said delivery means;
   an accelerator connected to said control means, said control means being for controlling said degree of actuation of said delivery means responsive to a setting of said accelerator during a manual running mode;
   mode setting means for transferring control to a constant-speed running mode in which a speed of said vehicle is maintained at a target vehicle speed from said manual running mode, and for transferring control to said manual running mode from said constant-speed running mode;
   constant-speed running means for controlling said degree of actuation of said throttle independently of said setting of said accelerator during said constant-speed running mode, said control means being for controlling said degree of actuation of said delivery means responsive to said constant-speed running means during said constant-speed running mode;
   range determining means for determining whether a degree of actuation of said delivery means before transfer of control to said constant-speed running mode is within a given region;
   initial opening setting means for setting, at a time of transfer to said constant-speed running mode, a degree of delivery means actuation before said transfer to an initial delivery means actuation value, responsive to a determination by said range determining means that said degree of actuation of said delivery means before said transfer is within said region, and to a given value responsive to a determination by said range determining means that said degree of actuation of said delivery means is not within said region; and
   actuation degree restoring means for setting said degree of actuation of said delivery means to said degree of delivery means actuation before said transfer when said mode setting means transfers control from said constant-speed running mode to said manual running mode.

6. The system of claim 5, wherein said material delivery means is a throttle.

7. The system of claim 5, wherein said engine is an internal combustion engine.

8. The system of claim 5, wherein said medium is air.

9. The system of claim 5, wherein said region is based on a parameter representative of a speed of said vehicle.

10. The system of claim 9, wherein said parameter is rotational speed of drive wheels of said vehicle.

11. The system of claim 9, wherein said parameter is rotational speed of said engine.

12. The system of claim 5, wherein said value is one of an upper limit and a lower limit of said region.

13. The system of claim 5, wherein said initial opening setting means is for setting, at a time of transfer to said constant-speed running mode, an upper limit of said region to said initial delivery means actuation value responsive to a determination by said range determining means that said degree of actuation of said delivery means before said transfer is greater than said upper limit of said region.

14. The system of claim 5, wherein said initial opening setting means is for setting, at a time of transfer to said constant-speed running mode, a lower limit of said region to said initial delivery means actuation value responsive to a determination by said range determining means that said degree of actuation of said delivery means before said transfer is less than said lower limit of said region.

15. The system of claim 5, wherein said constant-speed running means includes means for setting a target delivery means actuation degree by computing a proportional term and an integral term of said delivery means actuation degree based on a difference between said target vehicle speed and a drive wheel speed and by adding said proportional term and said integral term.

16. A method of performing cruise control on an engine of a vehicle, said method comprising the steps of:

regulating flow of a medium to an engine of said vehicle using a delivery control device;

controlling a degree of actuation of said delivery control device, said control being performed responsive to a setting of an accelerator during a manual running mode and responsive to a controller, independently of said accelerator, during said constant-speed running mode;

transferring a control mode from said manual running mode to said constant-speed running mode;

determining whether a degree of actuation of said delivery control device before performing said transferring step is within a given region;

setting a degree of delivery control device actuation before performing said transferring step to an initial delivery control device actuation value responsive to a determination by said determining step that said degree of actuation of said delivery control device is within said region, and to a given value responsive to a determination by said determining step that said degree of actuation of said delivery control device before performing said transferring step is not within said region;

changing said control mode from said constant-speed running mode to said manual running mode; and resetting said degree of actuation of said delivery control device to said degree of actuation of said delivery control device before performing said transferring step responsive to performance of said changing step.

17. The method of claim 16, wherein said setting step comprises a step of setting said degree of delivery control device actuation before performing said transferring step to one of an upper limit of said region and a lower limit of said range responsive to said determination by said determining step that said degree of actuation of said delivery control device is not within said region.

18. The method of claim 16, wherein said setting step comprises a step of setting an upper limit of said region to said initial delivery means actuation value responsive to a determination by said determining step that said degree of actuation of said delivery control device before performing said transforming step is above said upper limit of said region.

19. The method of claim 16, wherein said setting step comprises a step of setting a lower limit of said region to said initial delivery means actuation value responsive to a determination by said determining step that said degree of actuation of said delivery control device before performing said transferring step is below said lower limit of said region.

20. The method of claim 16, further comprising a step of setting a target delivery means actuation degree by computing a proportional term and an integral term of said delivery means actuation degree based on a difference between said target vehicle speed and a drive wheel speed and by adding said proportional term and said integral term.

\* \* \* \* \*